(12) United States Patent
Toi

(10) Patent No.: US 7,142,731 B1
(45) Date of Patent: Nov. 28, 2006

(54) IMAGE PROCESSING SYSTEM

(75) Inventor: Takao Toi, Tokyo (JP)

(73) Assignee: NEC Corporation, Tokyo (JP)

( * ) Notice: Subject to any disclaimer, the term of this patent is extended or adjusted under 35 U.S.C. 154(b) by 613 days.

(21) Appl. No.: 09/505,429

(22) Filed: Feb. 16, 2000

(30) Foreign Application Priority Data

Feb. 17, 1999 (JP) ................................ 11-038970

(51) Int. Cl.
G06K 9/54 (2006.01)
H04N 7/08 (2006.01)
H04N 5/235 (2006.01)

(52) U.S. Cl. .................... 382/307; 348/476; 348/222.1

(58) Field of Classification Search ............. 348/222.1, 348/211.14, 211.5, 211.6, 476–479, 571, 348/211.99; 716/16; 382/307, 276
See application file for complete search history.

(56) References Cited

U.S. PATENT DOCUMENTS 5,301,344 A * 4/1994 Kolchinsky .................. 712/32
5,486,853 A * 1/1996 Baxter et al. ............. 348/222.1
5,754,227 A * 5/1998 Fukuoka .................. 348/231.6

OTHER PUBLICATIONS

H. Okada et al., "Digital Still Camera System with Real Time Signal Processor", Preliminary Reports of Image Information Media Society Annual Convention, (Jul. 1998), pp. 389-390.

* cited by examiner

Primary Examiner—Vikkram Bali
Assistant Examiner—Colin LaRose
(74) Attorney, Agent, or Firm—Sughrue Mion, PLLC

(57) ABSTRACT

An image processing system whose circuit size is small, and whose dissipation power is small is provided. The image processing system executes digital image processing of an interval of active pixel in the condition that a first internal logic description is written in a field programmable gate array. Subsequently, in interval of non-active pixel with the exception of the interval of active pixel, the image processing system executes digital control processing in the condition that the first internal logic description of the field programmable gate array is rewritten to a second internal logic description. The image processing system executes again the digital image processing in the condition that the second internal logic description of the field programmable gate array is rewritten to the first internal logic description.

22 Claims, 7 Drawing Sheets

IMAGE PROCESSING SYSTEM

BACKGROUND OF THE INVENTION

The present invention relates to an image processing system for processing an image data.

DESCRIPTION OF THE PRIOR ART

In the conventional digital still camera or the video camera uses an image pick-up element. The digital still camera and/or the video camera executes digital conversion of an output signal from the image pick-up element. The digital-converted image signal is inputted to a general-purpose CPU or a wired logic processing device. The general purpose CPU or the wired logic processing device executes an image processing such as color separation processing and/or image compression processing. A lot of digital still camera execute digital image processing so as to be able to alter processing system of the image easily by using the general-purpose CPU. On the other hand, the video camera requires high speed moving image processing device. In the video camera, when the moving image processing is executed using general-purpose CPU, in a lot of cases, performance of the general-purpose CPU is insufficient. Thus, in a lot of cases, the moving image processing is executed using dedicated wired logic processing device. Further, literature: "Digital Still Camera System with Real Time Signal Processor" by Okada, et al. Preliminary Reports of Image Information Media Society Annual Convention 1998, 29-2, July, 1998, discloses the Image Processing System. In this image processing system, the general-purpose CPU is combined with the wired logic processing device.

However, in the conventional image processing system, there are following some problems to be achieved. In a lot of cases, the digital still camera processes image signal by the general-purpose CPU. In such the cases, there is the problem that it is required long time from pressing the shutter until the end of processing in comparison with the case of the silver-chloride film camera. In order to achieve this problem, in the conventional image processing system, a plurality of frame memories are used for shortening shutter time. Another problem occurs that it is necessary to use a large quantity of memories.

Furthermore, in the conventional image processing system, it is necessary to cause an operating frequency of the CPU to increase resulting in high speed processing, thus processing time is reduced. However, there is the problem that dissipation power per pixel is large in comparison with the case of dedicated wired logic processing device whose parallel processing property is high. The reason why, the general-purpose CPU is capable of executing processing in accordance with the command. The general-purpose CPU has general-purpose property that the general-purpose CPU is capable of progressing the processing in accordance with the instruction. However, it is difficult for the general purpose CPU to cause an operation circuit to be operated simultaneously in parallel. Thus, energy efficiency deteriorates in comparison with the wired logic processing device. For instance, the general-purpose CPU is incapable of executing the operation more than the number of the operation circuit which is readied in every 1 clock fundamentally. On the other hand, the wired logic processing device is capable of executing something-instruction simultaneously by executing the pipe-line processing.

In the video camera, there is a problem that the design of dedicated wired logic device for the moving image processing becomes longer than developing interval of program of the general-purpose CPU. It takes long time for designing and manufacturing the dedicated wired logic processing device. The interval of designing and manufacturing of the dedicated wired logic processing device is compared with compile and/or simulation of interval of program developing. The interval of designing and manufacturing of the dedicated wired logic processing device is longer than the interval of compile and simulation for the general-purpose CPU. Further, in the video camera, the general-purpose CPU is capable of halting operation because debug environment for halting operation is regulated. On the other hand, the dedicated wired logic processing device is difficult to halt operation, so that it is difficult to discover problem on processing.

SUMMARY OF THE INVENTION

In view of the foregoing, it is an object of the present invention in order to overcome the above-mentioned problem, to provide an image processing system whose circuit scale is small, and whose dissipation power is small.

First of all, in the present invention, two terms: "field programmable gate array" (FPGA) and "internal logic description" will be used. The field programmable gate array is an array which is capable of configuring a dynamic reconfigurable system. The dynamic reconfigurable system enables Wired Logic to be altered arbitrarily and dynamically. The internal logic description is an application program which is written in the above field programmable gate array, or which is executed on the chip of the above field programmable gate array.

According to a first aspect of the present invention, in order to achieve the above-mentioned object, there is provided an image processing system provided with a field programmable gate array which is capable of altering an internal logic description prescribing operation during operating state, wherein an image processing method of the image processing system which comprises the steps of executing digital image processing of interval of active pixel in the condition that a first internal logic description is written in the field programmable gate array, executing digital control processing in the condition that the first internal logic description of the field programmable gate array is rewritten to a second internal logic description in interval of non-active pixel with the exception of the interval of active pixel, and executing digital image processing again in the condition that the second internal description is rewritten to the first internal logic description.

According to a second aspect of the present invention, in the first aspect, there is provided an image processing system, wherein there is provided an image pick-up element, and the image processing system executes color signal processing of picked-up image by the image pick-up element during the interval of active pixel, while during the interval of non-active pixel, the image processing system executes the digital control processing in relation to the color signal processing.

According to a third aspect of the present invention, in the first aspect, there is provided an image processing system, wherein the interval of non-active pixel is a vertical blanking interval.

According to a fourth aspect of the present invention, in the first aspect, there is provided an image processing system, wherein the interval of non-active pixel is a horizontal blanking interval.

According to a fifth aspect of the present invention, in the first aspect, there is provided an image processing system, wherein the image processing system executes image compression processing in the interval of active pixel, and the image processing system executes digital control processing in relation to the image compression processing in the interval of non-active pixel.

According to a sixth aspect of the present invention, in the first aspect, there is provided an image processing system, wherein the digital control processing is code quantity control processing.

According to a seventh aspect of the present invention, in the second aspect, there is provided an image processing system, wherein the interval of non-active pixel is an interval of optical black pixel of the image pick-up element.

According to an eighth aspect of the present invention, in the second aspect, there is provided an image processing system, wherein the digital control processing is an automatic white balance control processing.

According to a ninth aspect of the present invention, in the second aspect, there is provided an image processing system, wherein the digital control processing is an auto-focus control processing.

According to a tenth aspect of the present invention, in the second aspect, there is provided an image processing system, wherein the digital control processing is an automatic lightness control processing.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail in accordance with the accompanying drawings.

Figure 1:
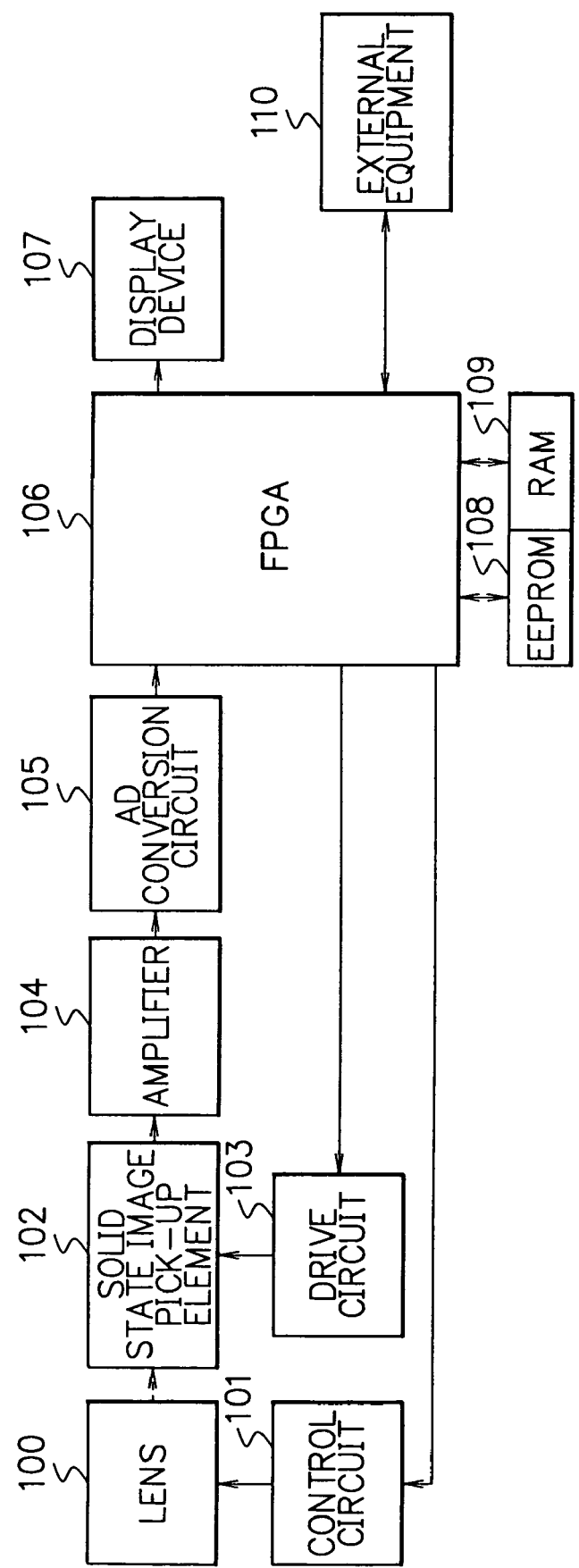
FIG. 1 is a block diagram showing an image processing system as a first embodiment of the present invention.

FIG. 1 is a block diagram showing an image processing system as a first embodiment of the present invention. As shown in FIG. 1, the image processing system as one embodiment of the present invention comprises a lens 100, a control circuit 101, a solid state image pick-up element 102, a drive circuit 103, an amplifier 104, an AD conversion circuit 105, an FPGA (Field Programmable Gate Array) 106, a display device 107, a storage device 108 such as EEPROM (Electrically Erasable Programmable Read-Only Memory), an RAM (Random Access Memory) 109, and an external equipment 110.

A light permeates the lens 100. The permeated light undergoes photoelectric conversion at the solid state image pick-up element 102. The lens 100 is controlled by the control circuit 101. The solid state image pick-up element 102 is driven by the drive circuit 103. The amplifier 104 controls gain of an analog image output signal of the solid state image pick-up element 102. The AD conversion circuit converts the image output signal of the amplifier 104 into digital signal by the AD conversion circuit 105. The FPGA 106 receives the digital image signal of the AD conversion circuit 105 to execute image processing. An output of the FPGA 106 is displayed on the display device 107. A person who picks-up image is capable of confirming a subject by virtue of the displayed output. Operation of the FPGA 106 is prescribed due to the internal logic description. The storage device 108 stores therein the internal logic description of the FPGA 106. The external equipment 110 is capable of rewriting the data of the storage device 108 or the internal logic description of the FPGA 106. The RAM 109 stores temporarily therein result of image processing, result of halfway of an operation, and control value which are executed in the FPGA 106. Furthermore, the RAM 109 is also provided on the inside of the FPGA 106.

Figure 2:
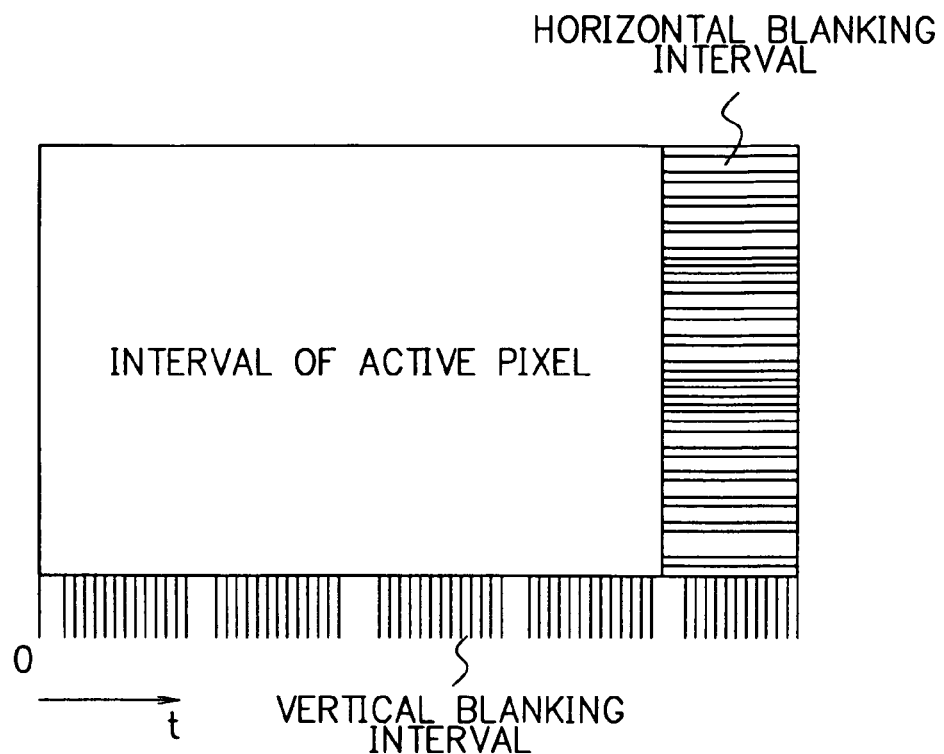
FIG. 2 is a view explaining both of interval of active pixel and blank interval of the image processing system of FIG. 1.
Figure 3:
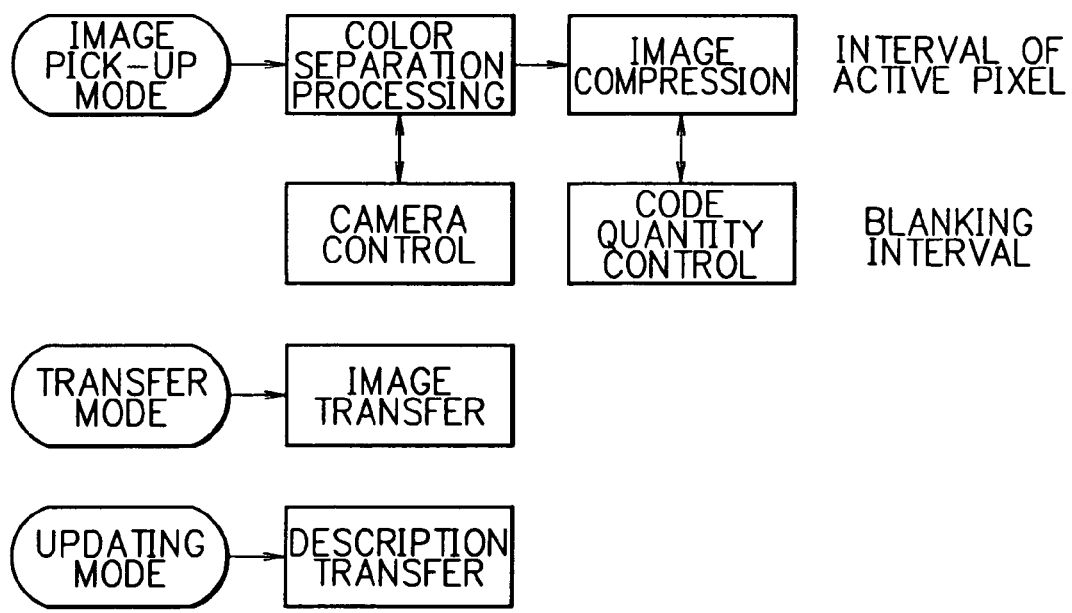
FIG. 3 is a view explaining one example of rewriting procedure of the internal logic description of FPGA (Field Programmable Gate Array) in the image processing system of FIG. 1.

Next, there will be described the case where a digital camera with image compressing function is realized by the image processing system. The internal logic description of the FPGA 106 is transferred during operation from the storage device 108 or a storage device provided on the inside of the FPGA 106 to use. The image processing system becomes image pick-up mode during image picking-up. The image processing system executes the color separation processing during interval of active pixel. In interval of non-active pixel with the exception of the interval of active pixel, the image processing system rewrites the internal logic description of the FPGA 106 to an internal logic description for controlling camera. Then, the image processing system executes automatic control such as an automatic white balance control processing, an auto-focus control processing, and an automatic lightness control processing. Subsequently, the image processing system rewrites the internal logic description of the FPGA 106 to the internal logic description for the sake of the color separation processing again. Here, as shown in FIG. 2, horizontal blanking interval, vertical blanking interval, optical black pixel interval and so forth mean scanning interval of active pixel of the image pick-up element. Consequently, the interval of non-active pixel with the exception of the interval of active pixel means scanning interval with the exception of the interval of active pixel of the image pick-up elements such as the horizontal blanking interval, the vertical blanking interval, the optical black pixel interval, and so forth. Here, when the shutter is pressed, or image is recorded, the internal logic description of the FPGA 106 is rewritten to the internal logic description for the sake of image compression processing. The external equipment 110 is connected to the image processing system. The image processing system receives instruction that the image is transferred. The image processing system becomes transferring mode. Furthermore, the external equipment 110 is connected to the image processing system, before instruction that the internal logic description is updated is given. The image processing system becomes updating mode. FIG. 3 indicates state of respective modes.

Next, the internal logic description written in the FPGA 106 corresponds to the respective modes. One example of constitution of the internal logic description written in the FPGA 106 at the time of the respective modes is shown. Further, in the processing of the internal logic description, when the whole can not be written therein at a time, because gate scale of the FPGA 106 is small, it is necessary to divide the internal logic description according to the processing contents. Inversely, when the gate scale of the FPGA 106 is sufficiently large, the processing is capable of being realized by rewriting only a part of the FPGA 106. Furthermore, during the interval when switching the processing mode, image and/or control value is written in the RAM 109 temporarily. The image and/or the control value is read-out according to demand.

Figure 4:
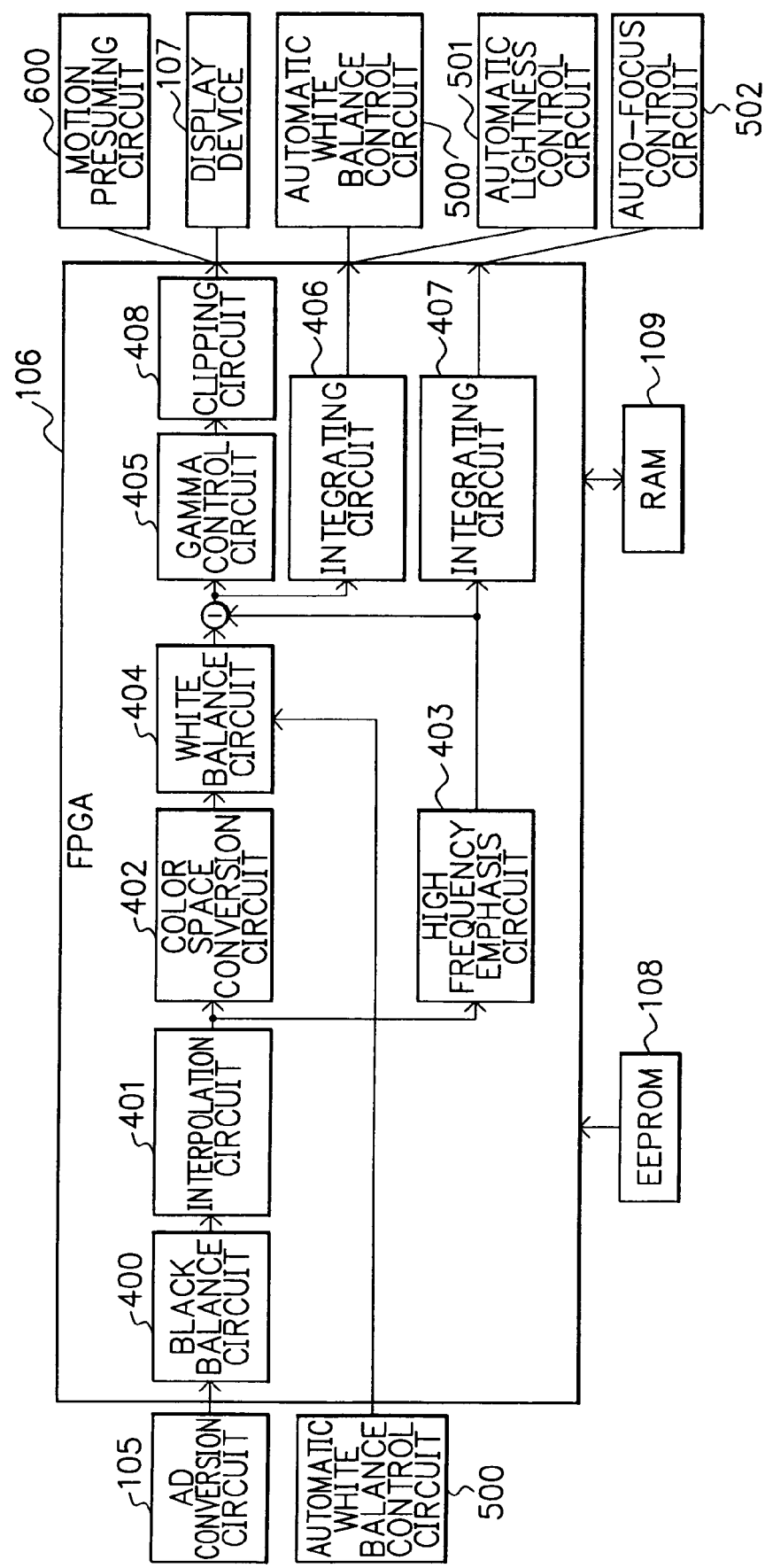
FIG. 4 is a block diagram showing one example of constitution in the case where FPGA is used for color separation processing in the image processing system of FIG. 1.

FIG. 4 is a block diagram showing one example of constitution in the case where the FPGA 106 is used for color separation processing. The FPGA 106 is capable of being used for the color separation processing. A black balance circuit 400 inputs therein a digital signal of the AD conversion circuit 105. The digital signal of the AD conversion circuit 105 adjusts black level of the black balance circuit 400. Next, an interpolation circuit 401 executes a pixel interpolation in accordance with a color filter formed on an image pick-up element concerning a digital signal from the black balance circuit 400. Further, a color space conversion circuit 402, a white balance circuit 404, a gamma control circuit 405, and a clipping circuit 408 execute color processing appropriate to image pick-up environment, or image display environment concerning digital signal. Furthermore, a high frequency emphasizing circuit 403 executes high frequency emphasizing processing concerning digital signal according to command. An integrating circuit 406 executes an integrating operation of output signal of the white balance circuit 404 for the sake of automatic white balance control described later. Similarly, an integrating circuit 407 executes integrating operation of an output signal of the high frequency emphasizing circuit 403.

Figure 5:
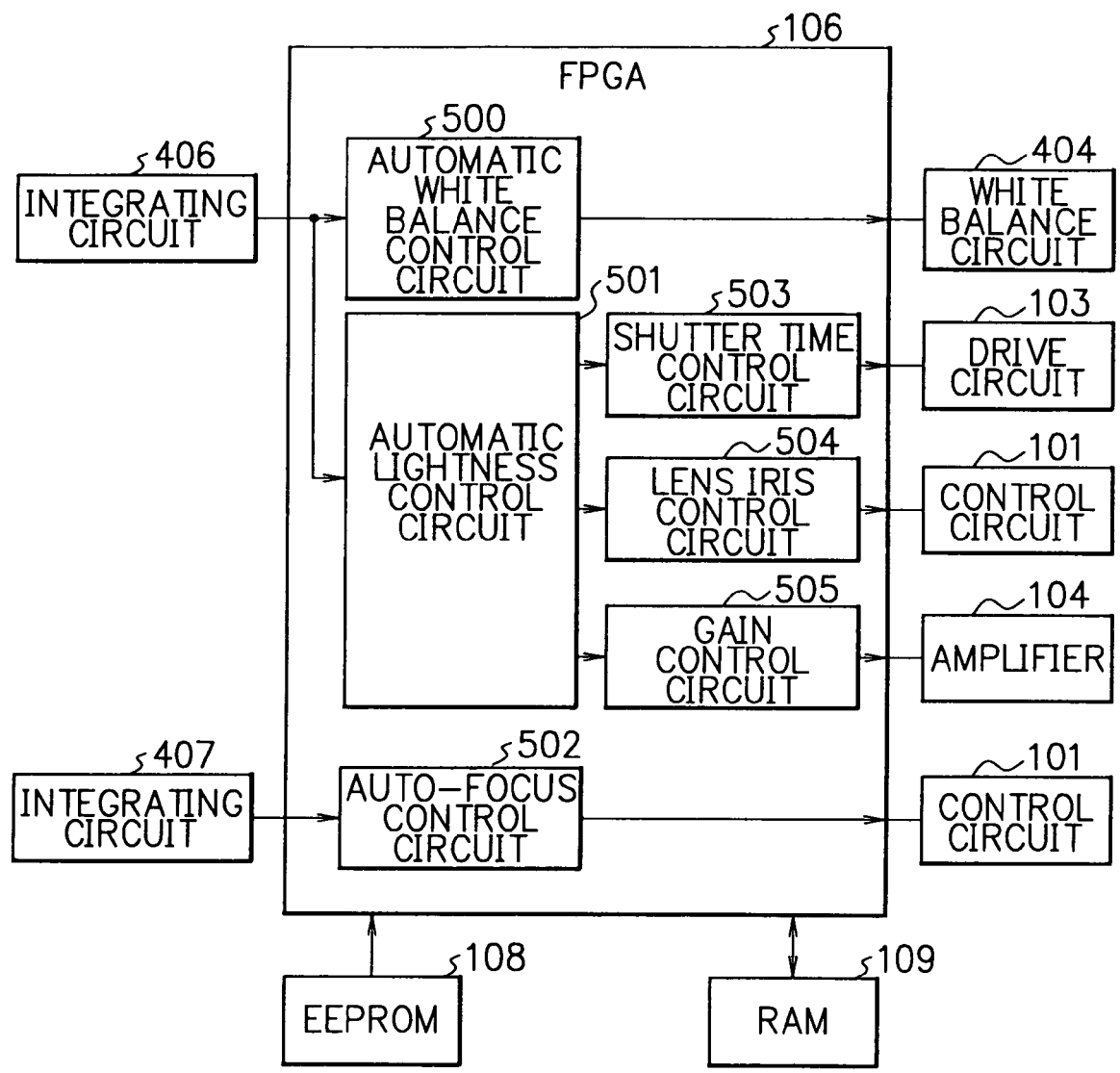
FIG. 5 is a block diagram showing one example of constitution in the case where FPGA is used for camera control processing in the image processing system of FIG. 1.

FIG. 5 is a block diagram showing one example of a constitution in the case where the FPGA 106 is used for a camera control processing. An output value of the integrating circuit 406 is inputted to an automatic white balance control circuit 500 and an automatic lightness control circuit 501. An output value of the automatic white balance control circuit 500 becomes a control value of the white balance circuit 404. Further, the automatic lightness control circuit 501 receives the output value of the integrating circuit 406, before determining shutter time, lens iris, and control value of gain. The respective control values control the control circuit 101, the drive circuit 103, and the amplifier 104 through a shutter time control circuit 503, a lens iris control circuit 504, and a gain control circuit 505. An auto-focus control circuit 502 executes control of the focus using output value of the integrating circuit 407. Thus the auto-focus control circuit 502 controls position of a lens 100 through the control circuit 101.

Figure 6:
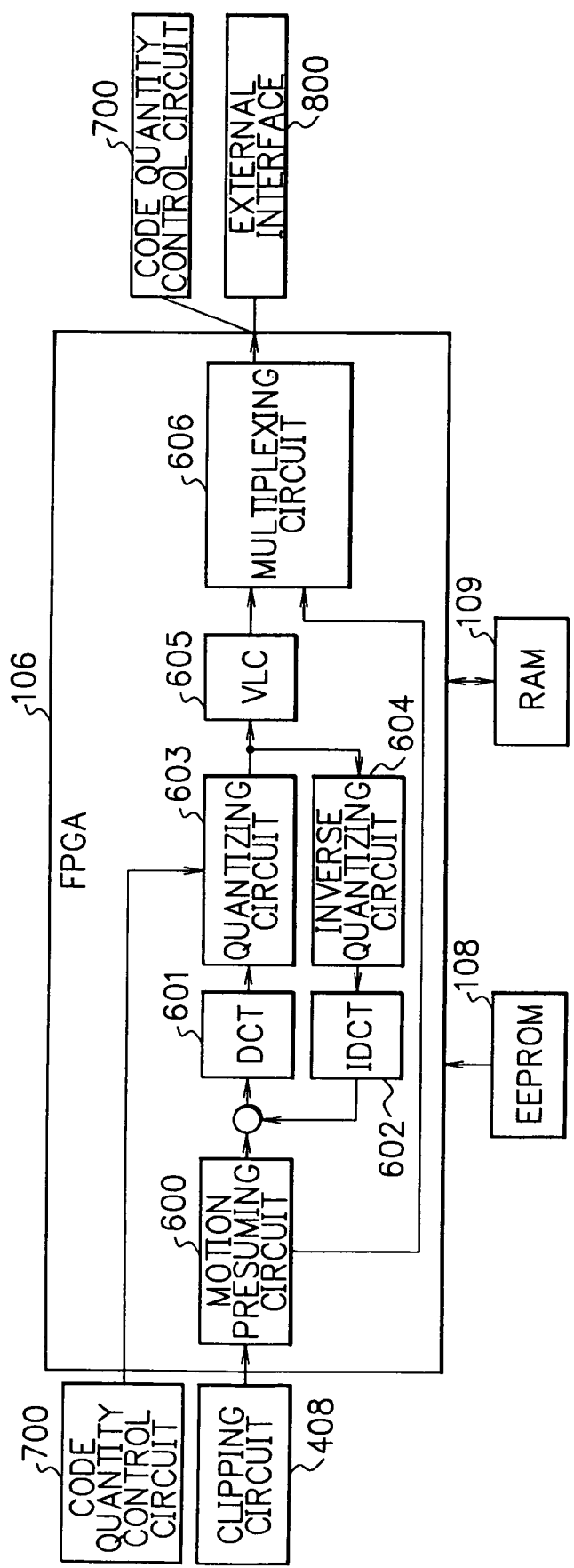
FIG. 6 is block diagram showing one example of constitution in the case where FPGA is used for image compression processing in the image processing system of FIG. 1.

FIG. 6 is a block diagram showing one example of a constitution in the case where the FPGA 106 is used for the image compression processing. A motion presuming circuit 600 receives an image signal undergoing color separation processing from the clipping circuit 408 to presume operation of the image. Next, a discrete cosine transform circuit (DCT) 601 receives an image signal from the motion presuming circuit 600 to execute frequency conversion. A quantizing circuit 603 quantizes the image signal. It is necessary to prevent accumulation of error caused by quantization of the image signal. For that reason, the output of the quantizing circuit 603 is returned to an inverse quantizing circuit 604, and an inverse discrete cosine transform (IDCT) 602 in order. The output of the quantizing circuit 603 is returned to the image signal according to such procedure. The obtained such image signal is subtracted from the original image signal. A variable-length coding circuit (VLC) 605 compresses the output of the quantizing circuit 603. A multiplexing circuit 606 executes multiplexing of compressed output of the quantizing circuit 603 and the output of the motion presuming circuit 600.

Figure 7:
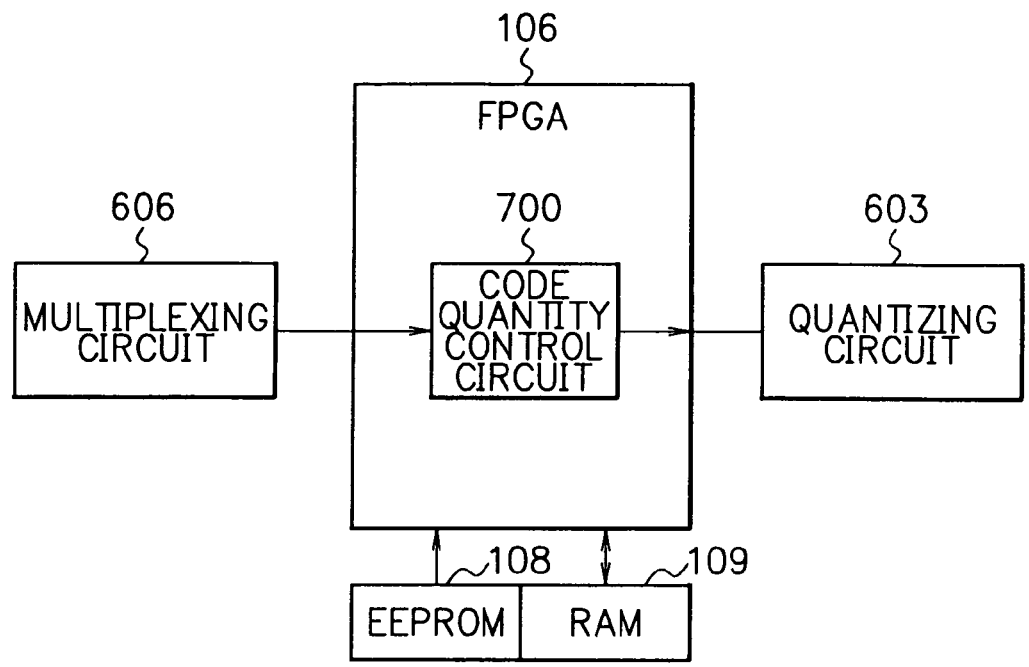
FIG. 7 is a block diagram showing one example of constitution in the case where FPGA is used for code quantity control processing in the image processing system of FIG. 1.
Figure 8:
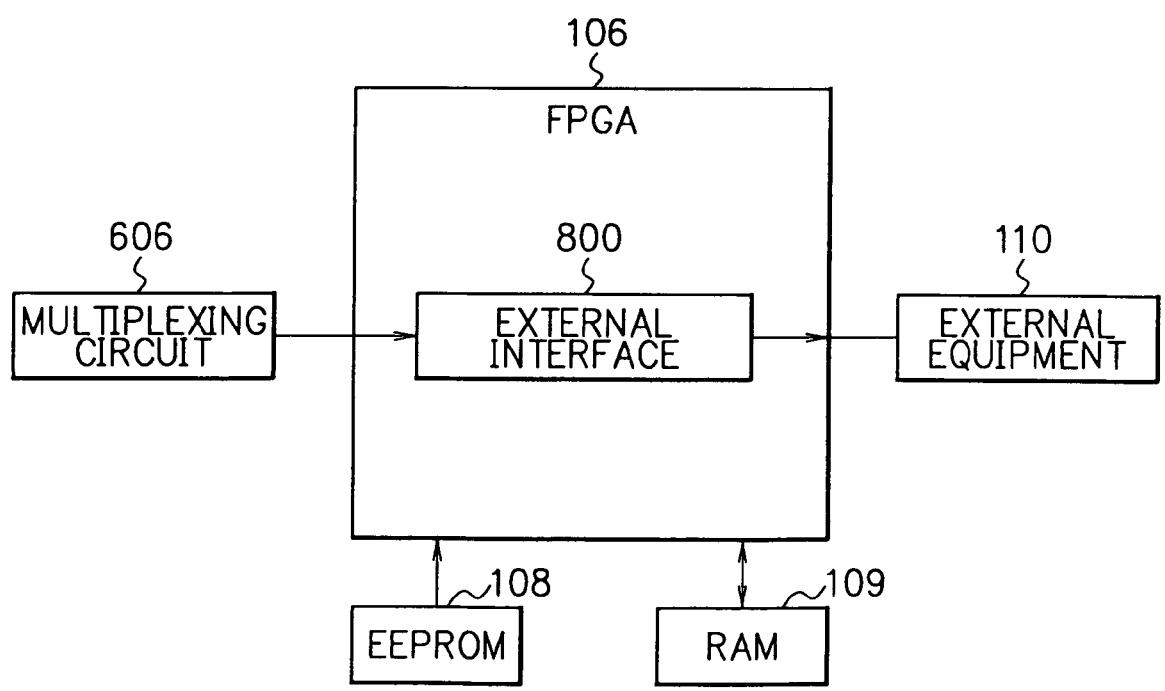
FIG. 8 is a block diagram showing a constitution in the case where FPGA is used for image transfer processing in the image processing system of FIG. 1.

FIG. 7 is a block diagram showing one example a constitution in the case where the FPGA 106 is used for code quantity control processing. A code quantity control circuit 700 inputs therein code quantity outputted from the multiplexing circuit 606. The code quantity control circuit 700 controls the quantizing circuit 603 according to the code quantity outputted from the multiplexing circuit 606. FIG. 8 is a block diagram showing a constitution in the case where the FPGA 106 is used for image transfer processing. The multiplexing circuit 606 outputs non-compressed image or compressed image undergoing color separation processing. Such the non-compressed or the compressed image is inputted to an external interface circuit 800. The external interface circuit 800 is appropriate to transmission for the external equipment 110. Next, the FPGA 106 transfers the image to the connected external equipment 110.

Figure 9:
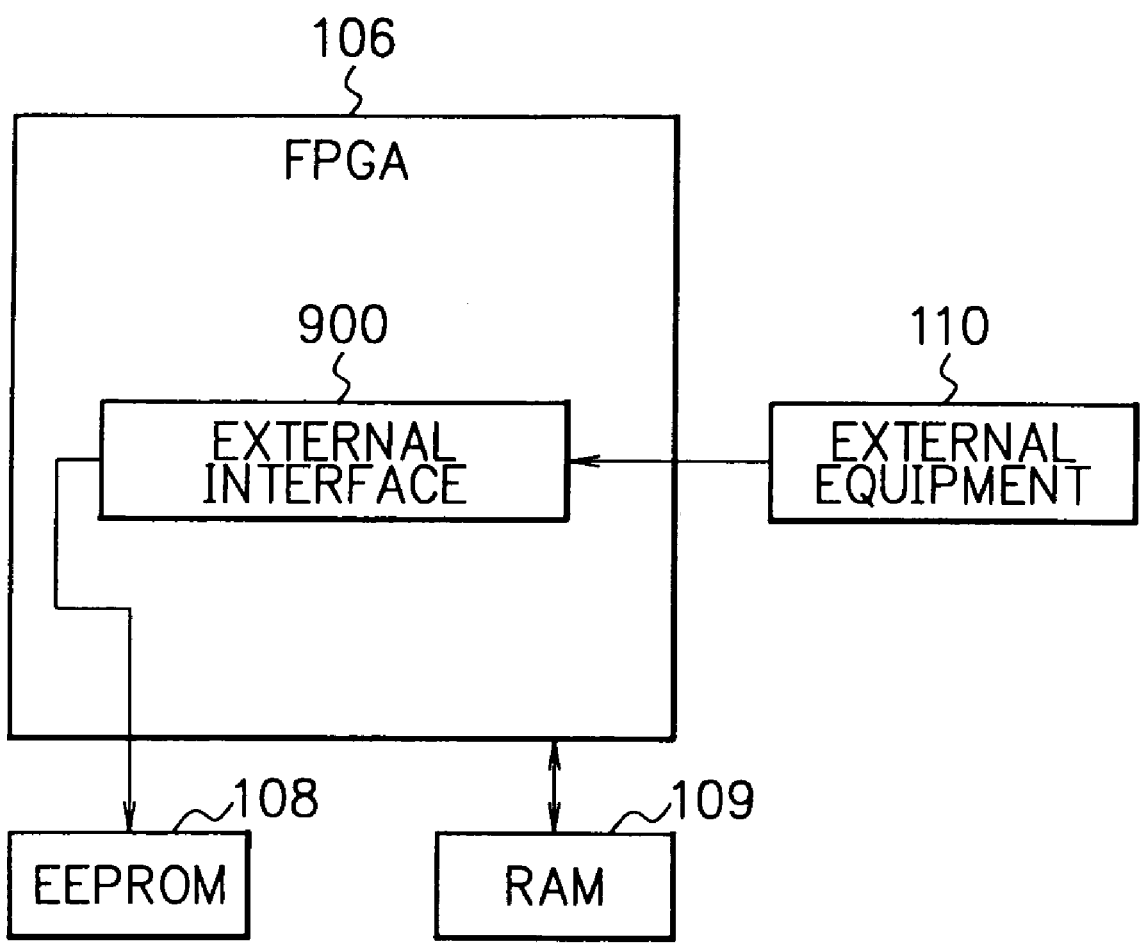
FIG. 9 is a block diagram showing one example of constitution in the case of updating the internal logic description of the FPGA in the image processing system of FIG. 1.

FIG. 9 is a block diagram showing one example of a constitution in the case where the internal logic description of the FPGA 106 is updated. A new internal logic description is transferred from the external equipment 110. The FPGA 106 transfers the new internal logic description to a storage device 108 through the external interface circuit 900. Further, the new internal logic description transferred from the external equipment 110 is also capable of rewriting directly the internal logic description of the FPGA 106.

In the image processing system, the general-purpose CPU executes the operation in accordance with the instruction after interpreting it. In such the general-purpose CPU, parallel operational property of the operation depends on number of operation circuit, number of pipe line, instruction, branch prediction and so forth. For that reason, the general-purpose CPU has low parallel operational property in comparison with the wired logic processing device. The wired logic processing device is capable of executing a pipeline processing about prescribed processing embedded beforehand. The FPGA 106 is a gate array which is capable of altering logic operation according to the internal logic description. The FPGA 106 has the same parallel operational property as that of the wired logic processing device in the condition that the internal logic description is written therein. Consequently, the wired logic processing device and the FPGA 106 are different from the general-purpose CPU. Although gate scale of the wired logic processing device and the FPGA 106 which describe processing content in parallel becomes large, it is capable of enhancing processing capacity. Further, particularly, in the type of FPGA 106 which stores the internal logic description in SRAM is capable of changing processing content easily. Such the FPGA 106 is capable of changing the processing content in such a way that the internal logic description is read from a storage area which is capable of rewriting. Furthermore, the FPGA 106 which is capable of rewriting the internal logic description during operation is capable of realizing processing more than number of logic gate in such a way that the logic circuit is subjected to time division to be updated.

In the image processing system, there are digital still camera and video camera which are provided with an image pick-up element. Such the image processing system rewrites the internal logic description of the FPGA 106 dynamically. The image processing system executes the color separation processing in the interval of active pixel. The image processing system executes automatic control processing such as automatic white balance control processing, auto-focus control processing, automatic lightness control processing and so forth in the interval of non-active pixel such as horizontal and/or vertical blanking interval. According to the above operation, it is capable of utilizing logic gate of the FPGA 106 effectively. Thus, it is unnecessary to prepare CPU provided separately for the sake of automatic control in the conventional way. Further, merit is brought, by using the FPGA 106 in the image processing. When problem occurs in the processing content, it is capable of changing the internal logic description so that maintenance property is improved.

According to the embodiment of the present invention, the FPGA (Field Programmable Gate Array) is used. The FPGA 106 is capable of enhancing processing capacity of operation. The wired logic processing device is capable of enhancing processing capacity in such a way that the wired logic processing device causes prescribed digital image processing which is embedded to be executed parallel operation processing. The FPGA 106 is capable of enhancing the processing capacity in the same way as that of the wired logic processing device. Consequently, the image processing system in which the FPGA 106 is used is capable of reducing processing time in comparison with the image processing system in which the general-purpose CPU is used. For instance, the general-purpose CPU is the condition that clock frequency is 200 MHz, and number of simultaneous publication instruction is 2 (two) instructions. On the other hand, the FPGA 106 operates on 200 MHz, having the number of parallel operation to be 100 (corresponding to CPU instruction). The FPGA 106 has five times of operation number capable of processing in every 1 (one) clock in comparison with the general-purpose CPU. Practically, it is difficult to execute programming so as to always realize 2 instructions of the number of simultaneous publication instruction of the CPU. Consequently, there is possibility that processing capacity of the CPU is further degraded.

Further, according to the embodiment of the present invention, the image processing system is capable of improving maintenance property and of reducing development interval in comparison with the image processing system using dedicated wired logic processing device. There are reasons therefor. The FPGA is capable of rewriting the internal logic description. The FPGA is capable of altering easily the processing contents. Therefore, the FPGA is capable of coping with the problem by only changing the internal logic description. This function thereof is the same as that of the general-purpose CPU. In particular, if there is provided with the means which is capable of changing the internal logic description from the external part, it is capable of updating the processing content as the software of the general-purpose CPU.

Furthermore, according to the embodiment of the present invention, the image processing system is capable of reducing chip number in use, and/or gate number to decrease dissipation power. There is the reason therefor. The FPGA is capable of rewriting the internal logic description during operation. The image processing system is capable of realizing processing more than logic gate number of the FPGA. Formerly, processing such as color signal processing, image compression processing, and control processing is processed while dividing into a plurality of chips. On the other hand, the processing such as color signal processing, image compression processing, and control processing is capable of realizing by only one chip. For instance, in the image processing system, the digital still camera, and/or the video camera has the image pick-up element. Such the image processing system is capable of executing the color separation processing during interval of active pixel. The image processing system is also capable of executing the control processing such as the automatic white balance control processing, the auto-focus control processing, and the automatic lightness control processing during the interval of non-active pixel. Thus such the image processing system is capable of utilizing the logic gate of the FPGA effectively. Consequently, the image processing system does not require the CPU for controlling separately.

Moreover, according to the embodiment of the present invention, the image processing system is capable of improving general-purpose property, and re-utilization property thereof. There is the reason therefor. It is capable of altering contents of reading processing from the storage area capable of rewriting concerning the internal logic description of the FPGA. Therefore, general-purpose property of the system improves. It becomes possible re-utilizes the system.

According to the present invention, the image processing system is capable of reducing the processing time in comparison with the image processing system using the general-purpose CPU for image processing. Further, according to the present invention, the image processing system is capable of reducing development interval and improving maintenance property in comparison with the image processing system using the dedicated wired logic processing device.

Furthermore, according to the present invention, the image processing system causes chip number in use, and gate number to be reduced, thus enabling dissipation power to be reduced. It is capable of improving general-purpose property and/or re-utilization property of the image processing system.

While preferred embodiments of the invention have been described using specific terms, such description is for illustrative purpose only, and it is to be understood that changes and variations may be made without departing from the spirit or scope of the following claims.

What is claimed is:

1. An image processing system provided with a field programmable gate array which is capable of altering an internal logic description, said description prescribing operation during an operating state, wherein an image processing method of said image processing system comprises:

executing digital image processing of an interval of active pixel in the condition that a first internal logic description is written in said field programmable gate array;

executing digital control processing in the condition that said first internal logic description of said field programmable gate array is rewritten to a second internal logic description in an interval of non-active pixel with the exception of said interval of active pixel; and executing digital image processing again in the condition that said second internal description is rewritten to said first internal logic description;

wherein all operations necessary to perform said digital image processing and said digital control processing are performed in said field programmable gate array.

2. An image processing system as claimed in claim 1, wherein there is provided an image pick-up element, and said image processing system executes color signal processing of picked-up image by said image pick-up element during said interval of active pixel, while during said interval of non-active pixel, said image processing system executes said digital control processing in relation to said color signal processing.

3. An image processing system as claimed in claim 1, wherein said interval of non-active pixel is a vertical blanking interval.

4. An image processing system as claimed in claim 1, wherein said interval of non-active pixel is a horizontal blanking interval.

5. An image processing system as claimed in claim 1, wherein said image processing system executes image compression processing in said interval of active pixel, and said image processing system executes digital control processing in relation to said image compression processing in said interval of non-active pixel.

6. An image processing system as claimed in claim 1, wherein said digital control processing is code quantity control processing.

7. An image processing system as claimed in claim 2, wherein said interval of non-active pixel is a interval of optical black pixel of said image pick-up element.

8. An image processing system as claimed in claim 2, wherein said digital control processing is an automatic white balance control processing.

9. An image processing system as claimed in claim 2, wherein said digital control processing is an auto-focus control processing.

10. An image processing system as claimed in claim 2, wherein said digital control processing is an automatic lightness control processing.

11. An image processing method for altering an internal logic description prescribing operation during an operating state comprising:

executing digital image processing of an interval of active pixel in the condition that a first internal logic description is written in a field programmable gate array;

executing digital control processing in the condition that said first internal logic description of said field programmable gate array is rewritten to a second internal logic description in an interval of non-active pixel with the exception of said interval of active pixel; and executing digital image processing again in the condition that said second internal description is rewritten to said first internal logic description;

wherein all operations necessary to perform said digital image processing and said digital control processing are performed in said field programmable gate array.

12. An image processing method as claimed in claim 11, further comprising:

executing color signal processing of an image picked up by an image pick-up element during said interval of active pixel; and executing said digital control processing in relation to said color signal processing during said interval of non-active pixel.

13. An image processing method as claimed in claim 11, wherein said interval of non-active pixel is a vertical blanking interval.

14. An image processing method as claimed in claim 11, wherein said interval of non-active pixel is a horizontal blanking interval.

15. An image processing method as claimed in claim 11, further comprising:

executing image compression processing in said interval of active pixel; and executing digital control processing in relation to said image compression processing in said interval of non-active pixel.

16. An image processing method as claimed in claim 11, wherein said digital control processing is code quantity control processing.

17. An image processing method as claimed in claim 12, wherein said interval of non-active pixel is an interval of optical black pixel of said image pick-up element.

18. An image processing method as claimed in claim 12, wherein said digital control processing is an automatic white balance control processing.

19. An image processing method as claimed in claim 12, wherein said digital control processing is an auto-focus control processing.

20. An image processing method as claimed in claim 12, wherein said digital control processing is an automatic lightness control processing.

21. An image processing system provided with a field programmable gate array which is capable of altering an internal logic description, said description prescribing operation during an operating state, wherein an image processing method of said image processing system comprises:

executing digital image processing of an interval of active pixel in the condition that a first internal logic description is written in said field programmable gate array;

executing digital control pre-processing or post-processing relating to said image processing in the condition that said first internal logic description of said field programmable gate array is rewritten to a second internal logic description in an interval of non-active pixel with the exception of said interval of active pixel; and executing digital image processing again in the condition that said second internal description is rewritten to said first internal logic description.

22. An image processing system as claimed in claim 21, wherein said digital image processing and said digital control pre-processing or post-processing occur in one frame.

* * * * *